United States Patent
Kolze et al.

(10) Patent No.: US 9,071,397 B2
(45) Date of Patent: Jun. 30, 2015

(54) DETECTION AND CHARACTERIZATION OF LASER CLIPPING WITHIN COMMUNICATION DEVICES

(75) Inventors: Thomas J. Kolze, Phoenix, AZ (US); Bruce J. Currivan, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 547 days.

(21) Appl. No.: 13/428,270

(22) Filed: Mar. 23, 2012

(65) Prior Publication Data
US 2012/0243865 A1   Sep. 27, 2012

Related U.S. Application Data (60) Provisional application No. 61/467,638, filed on Mar. 25, 2011, provisional application No. 61/467,673, filed on Mar. 25, 2011.

(51) Int. Cl.
*H04B 10/08* (2006.01)
*H04L 1/00* (2006.01)
*H04L 1/20* (2006.01)

(52) U.S. Cl.
CPC ............ *H04L 1/004* (2013.01); *H04L 1/20* (2013.01); *H04L 2001/0096* (2013.01)

(58) Field of Classification Search
CPC ............ H04B 10/508; H04B 10/25137; H04B 10/07953; H04B 10/503; H04B 10/5162; H04B 10/5165; H04B 10/07955; H04B 10/07957; H04B 10/541; H04B 3/46; G02F 2203/54; G02F 2203/26; G01J 11/00; H01S 3/1121; H01S 5/0428; H04L 27/02; H04L 1/20; H04L 1/0061; H04L 1/004; H04L 27/2605

USPC ......... 398/199, 186–191, 140, 25, 17, 23, 38, 398/182
See application file for complete search history.

(56) References Cited

U.S. PATENT DOCUMENTS

| | | | |
|---|---|---|---|
| 5,850,303 A * | 12/1998 | Yamamoto et al. | 398/91 |
| 5,999,300 A * | 12/1999 | Davies et al. | 398/185 |
| 6,791,995 B1 | 9/2004 | Azenkot | |
| 7,813,653 B2 * | 10/2010 | Vieira et al. | 398/194 |
| 7,873,285 B2 * | 1/2011 | Zhou et al. | 398/192 |
| 7,921,351 B2 * | 4/2011 | Williams et al. | 714/784 |
| 7,978,985 B2 * | 7/2011 | Zheng | 398/208 |

(Continued)

*Primary Examiner* — Daniel Washburn
*Assistant Examiner* — Hibret Woldekidan
(74) *Attorney, Agent, or Firm* — Garlick & Markison; Shayne X. Short (57) ABSTRACT

Detection and characterization of laser clipping within communication devices. Identification of one or more harmonics associated with a fundamental frequency by which signaling is effectuated within the communication system for laser clipping identification. Appropriate spectral signal analysis is made to identify the presence of characteristic(s) (e.g., energy, amplitude, phase, and/or other characteristic(s)), if any, at one or more harmonic frequencies within a received signal. Appropriate time correlation is performed to distinguish whether or not characteristic(s) associated with at one or more of these harmonic bands is a result of laser clipping or from some other source (e.g., such as other signals within a communication system that happened to reside at those respective harmonic bands). Such appropriate identified correlation between characteristic(s) corresponding to a fundamental frequency band of the communication signal and characteristic(s) corresponding to one or more harmonics (e.g., of that fundamental frequency band) indicates laser clipping.

20 Claims, 8 Drawing Sheets

(56) References Cited

U.S. PATENT DOCUMENTS

| | | | |
|---|---|---|---|
| 8,165,474 B2* | 4/2012 | Zheng et al. | 398/193 |
| 8,165,475 B2* | 4/2012 | Zheng | 398/194 |
| 8,358,937 B2* | 1/2013 | Zheng | 398/194 |
| 8,891,699 B2* | 11/2014 | Currivan et al. | 375/346 |
| 2003/0179821 A1 | 9/2003 | Lusky | |
| 2007/0223920 A1* | 9/2007 | Moore et al. | 398/38 |
| 2010/0034542 A1* | 2/2010 | Armstrong | 398/158 |
| 2014/0294052 A1* | 10/2014 | Currivan et al. | 375/224 |

\* cited by examiner

- harmonics even and/or odd
- harmonic characteristic (e.g., energy, amplitude, phase, and/or other characteristic(s)) monitoring/detection

DETECTION AND CHARACTERIZATION OF LASER CLIPPING WITHIN COMMUNICATION DEVICES

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/467,638, entitled "Detection and characterization of laser clipping within communication devices,", filed Mar. 25, 2011, pending.

2. U.S. Provisional Patent Application Ser. No. 61/467,673, entitled "Upstream burst noise measurement and characterization during data transmission,", filed Mar. 25, 2011, pending.

Incorporation by Reference

The following U.S. Utility Patent Application is hereby incorporated herein by reference in its entirety and made part of the present U.S. Utility Patent Application for all purposes:

1. U.S. Utility patent application Ser. No. 13/428,357, entitled "Upstream burst noise measurement and characterization," filed concurrently on Mar. 23, 2012, pending, which claims priority pursuant to 35 U.S.C. §119(e) to the following U.S. Provisional Patent Applications which are hereby incorporated herein by reference in their entirety and made part of the present U.S. Utility Patent Application for all purposes:
   1.1. U.S. Provisional Patent Application Ser. No. 61/467,638, entitled "Detection and characterization of laser clipping within communication devices,", filed Mar. 25, 2011, pending.
   1.2. U.S. Provisional Patent Application Ser. No. 61/467,673, entitled "Upstream burst noise measurement and characterization during data transmission,", filed Mar. 25, 2011, pending.

BACKGROUND OF THE INVENTION

1. Technical Field of the Invention

The invention relates generally to communication systems; and, more particularly, it relates to detection and/or characterization of certain effects (e.g., clipping of light sources performing electrical to optical conversion) within such communication systems.

2. Description of Related Art

Data communication systems have been under continual development for many years. With such a communication system, characterization and/or estimation of any of a number of different parameters may be performed. For example, the communication channels are communication links over which signals traverse between communication devices may be analyzed for any of a number of reasons. For example, certain communication devices may perform appropriate processing of signals transmitted there from or received thereby based upon such characterization to improve the overall operation not only of those respective communication devices but the overall communication system. While the need to perform such characterization and/or estimation of various parameters within communication systems is well known, the prior art nonetheless continues to provide less than ideal solutions by which this may be made. As such, there continues to be a need to make such characterization and/or estimation of various parameters within communication systems in a better, more accurate, and more efficient way.

DETAILED DESCRIPTION OF THE INVENTION

Figure 1:
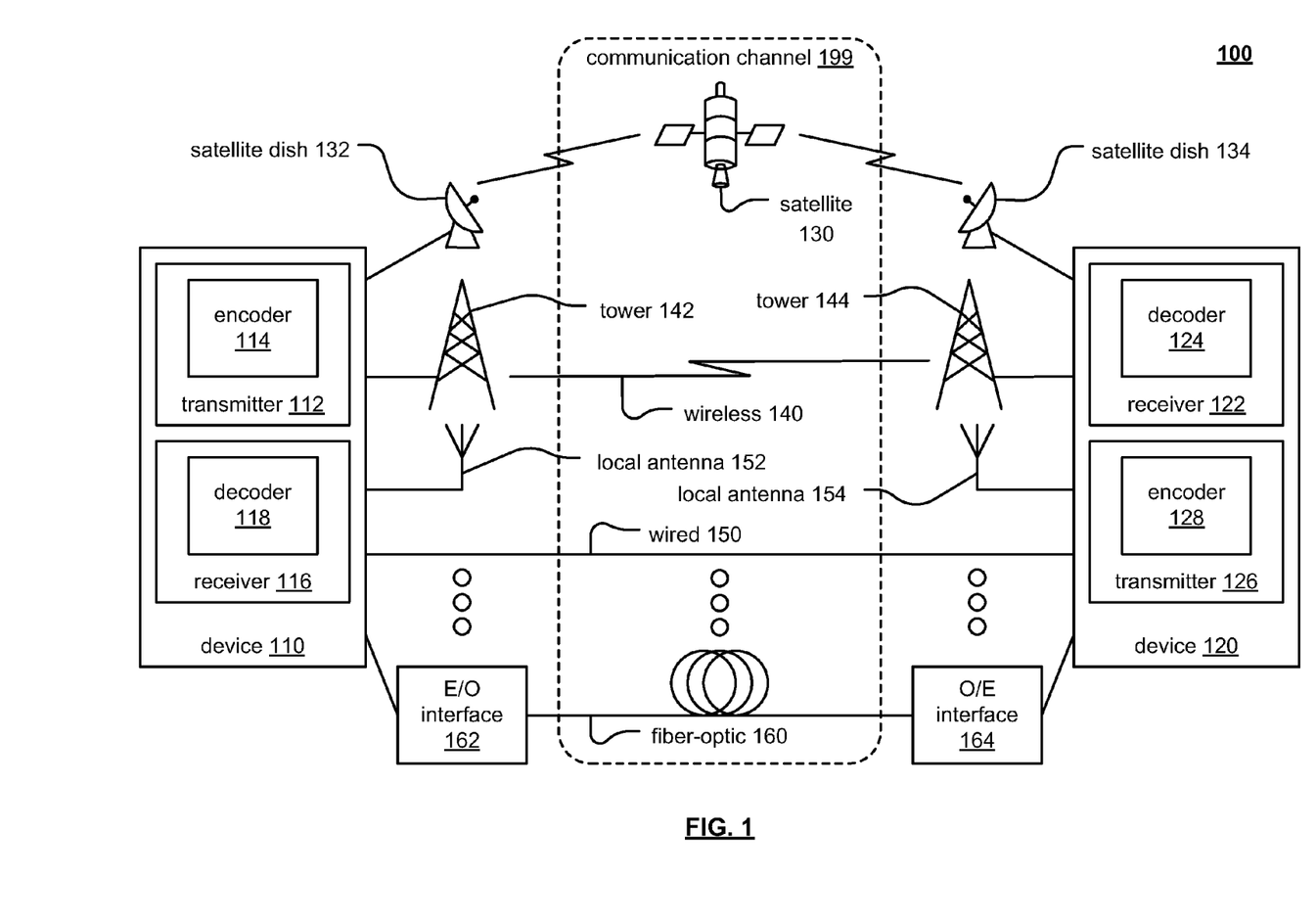
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
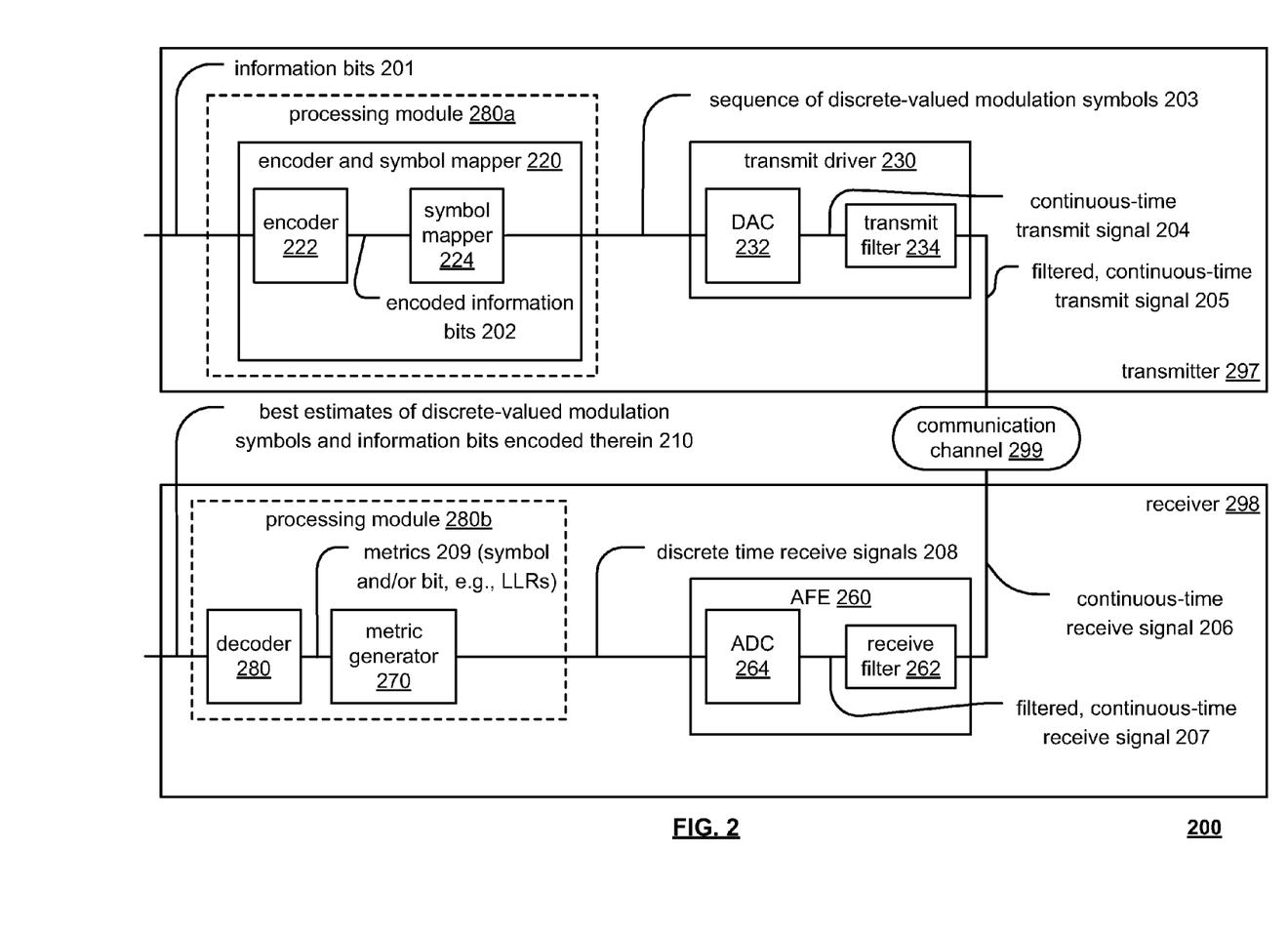

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
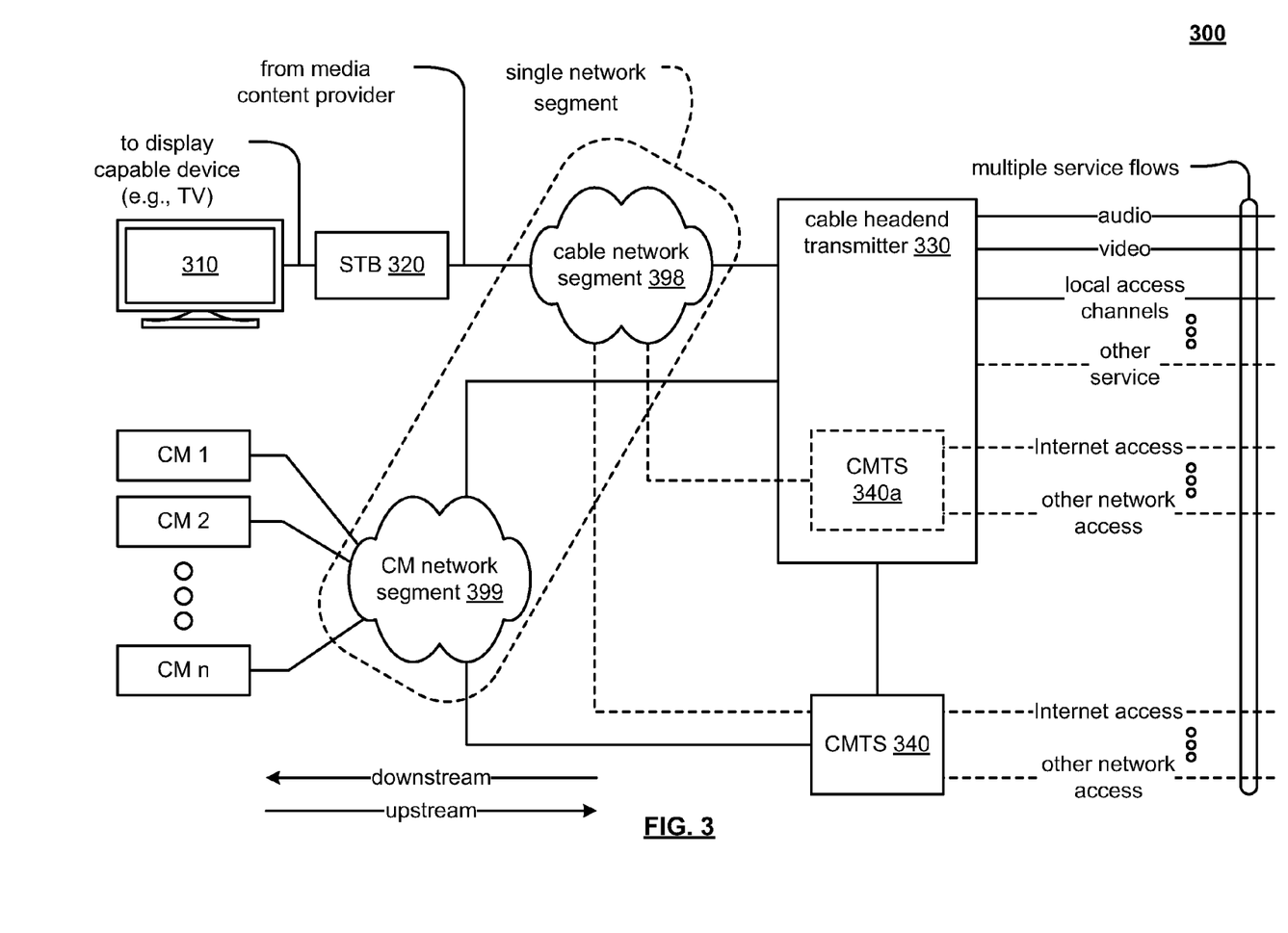

Referring to the communication system 300 of FIG. 3, this communication system 300 may be viewed particularly as being a cable system. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's headend, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the headend, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340a may also be coupled to the cable network segment 398, as the STB 320 may itself include cable modem functionality therein.

It is also noted that any one of the cable modems 1, 2, . . . m n, the cable headend transmitter 330, the CMTS 340 or 340a, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Within various types of communication systems, including those that have at least some segments of wired and/or optical fiber components (e.g., such as within a hybrid fiber-coaxial (HFC) network), certain components therein may operate non-linearly. That is to say, there may be certain complements within such communication systems that generate various non-linear effects. For example, clipping, such as from certain light sources (e.g., lasers, laser diodes, light emitting diodes, etc.) within an HFC network, may introduce certain non-linearities in regards to the signals output there from and generated thereby. It is noted that while many embodiments and/or diagrams herein employ the exemplary usage of laser clipping, it is noted that any such light source exhibiting analogous, similar, and/or equivalent characteristics may also benefit from various aspects, and their equivalents, of the invention.

Other components within such communication systems may also be sources of such non-linearities. For example, amplifiers implemented within such communication systems may generate certain non-linear effects including compression. Also, respective connectors, such as between various coaxial communication links and/or segments within an overall cable plant, may introduce certain non-linear effects (e.g., such as which may be associated with corrosion [e.g., calcifications] or other types of buildups on such respective connectors). Such corroded connectors within such a communication system may operate as mild diodes thereby introducing various non-linear effects Moreover, within digitally implemented communication systems, in which the signaling is implemented digitally (e.g., such as in accordance with quadrature amplitude modulation (QAM) signaling including generally signals having a rectangular leaf shaped magnitude as a function of frequency spectrum with some degree of roll-off) the effects of such non-linearities may be exacerbated more so than within prior communication systems in which all or most signaling therein was implemented in the analog domain. For example, such non-linearities may occur in quadratic form, cubic form, or in accordance with even higher orders. Generally, considering an input signal of x, the resultant signal y may be viewed as including any of a number of higher order inter-modulation products therein. For example, the resultant signal y may be described as follows as a function of x. $y=a_1 \times x + a_2 \times x^2 + a_3 \times x^3 + a_4 \times x^4 + a_5 \times x^5$ +and possibly any higher order terms.

The coefficients $a_1$, $a_2$, and so on may take on any of a number of desired values. In some embodiments, these respective coefficients associated with a higher order terms (e.g., $a_2$ and higher) will be relatively small (e.g., $10^{-2}$, $10^{-3}$, $10^{-4}$, $10^{-5}$, etc.).

Generally speaking, considering one such component which may be implemented within a communication system, and amplifier, the transfer function thereof (if perfect and ideal) simply be as follows:

$$y=x.$$

However, as described above, certain clipping may unfortunately occur within real life and non-ideal components. Such clipping may occur symmetrically in certain components, and such clipping may occur asymmetrically and other components (e.g., such as in accordance with light sources such as lasers). In accordance with such asymmetrical clipping, the respective values at which clipping occurs in two or more respective directions (e.g. in the positive and negative directions) are different, while in accordance with symmetrical clipping, the respective values at which clipping occurs in the two or more respective directions are the same at least in terms of absolute value. Moreover, in accordance with modeling such inter-modulation products, alternative expressions besides the polynomial shown above may alternatively be used (e.g., the hyperbolic tangent function, tanh, and/or other mathematical functions) without departing from the scope and spirit of the invention.

Figure 4:
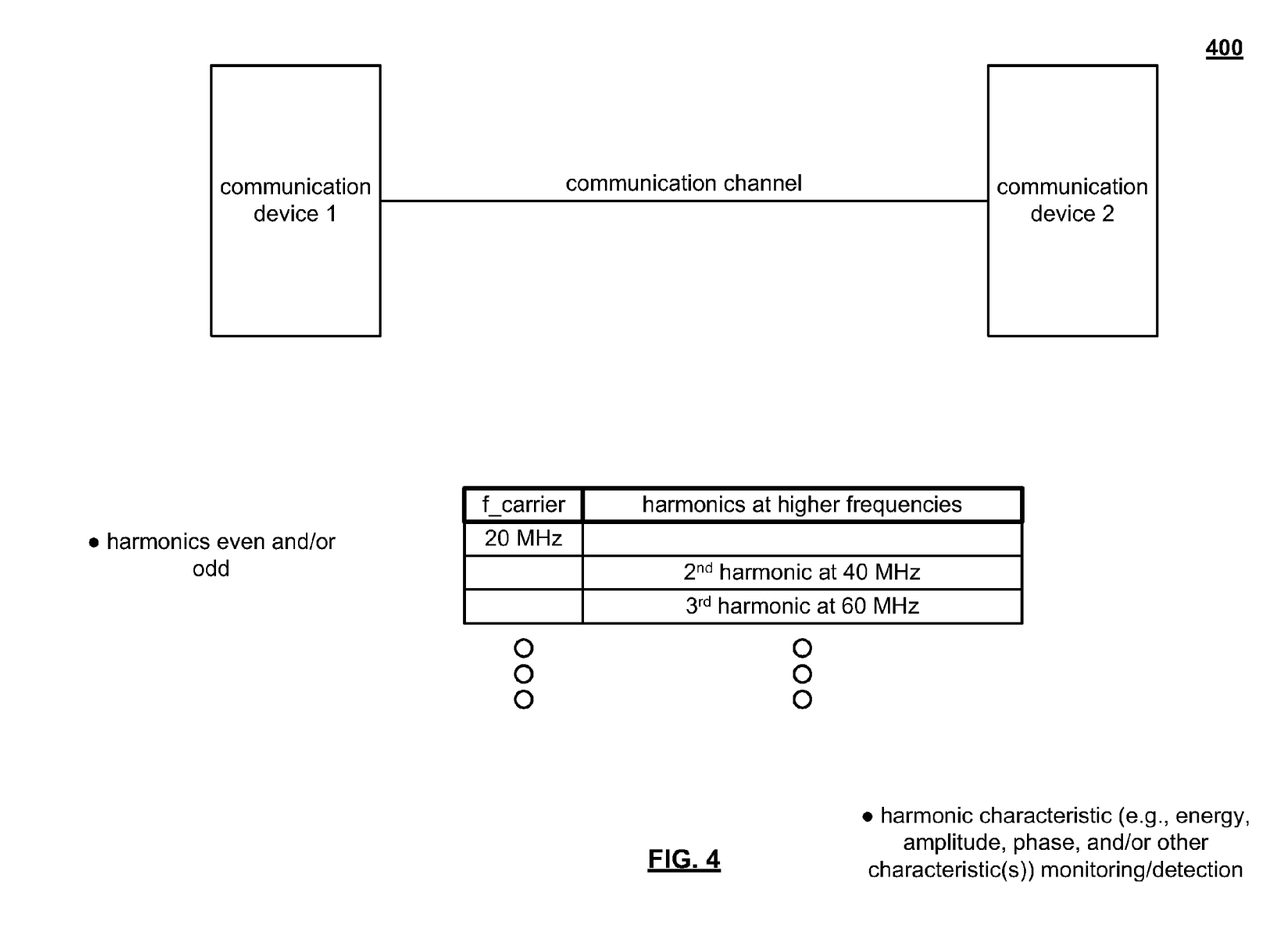
FIG. 4 illustrates an embodiment of communications between respective communication devices in a communication system.

FIG. 4 illustrates an embodiment 400 of communications between respective communication devices in a communication system. Generally speaking, communications between two respective communication devices may be made using a signal having a carrier frequency. In the event of laser clipping, certain higher-order harmonics may appear at higher frequencies. For example, if the carrier frequency is 20 MHz, then a second harmonic may occur at 40 MHz, a third harmonic may occur at 60 MHz, etc. By performing appropriate signal processing to monitor and identify the existence, if any, of such harmonics, appropriate identification of certain characteristics associated with laser clipping can be made. Based upon the identification of such characteristics (e.g., energy, amplitude, phase, in-phase (I) and quadrature (Q) information, and/or other characteristic(s)), determination of whether or not laser clipping is in fact occurring within the communication system may then be made.

Generally, a given device implemented with a communication system would like to have certain information corresponding to the operation of the remainder of the communication system, or at least portions thereof, with which the communication device interacts.

Figure 5:
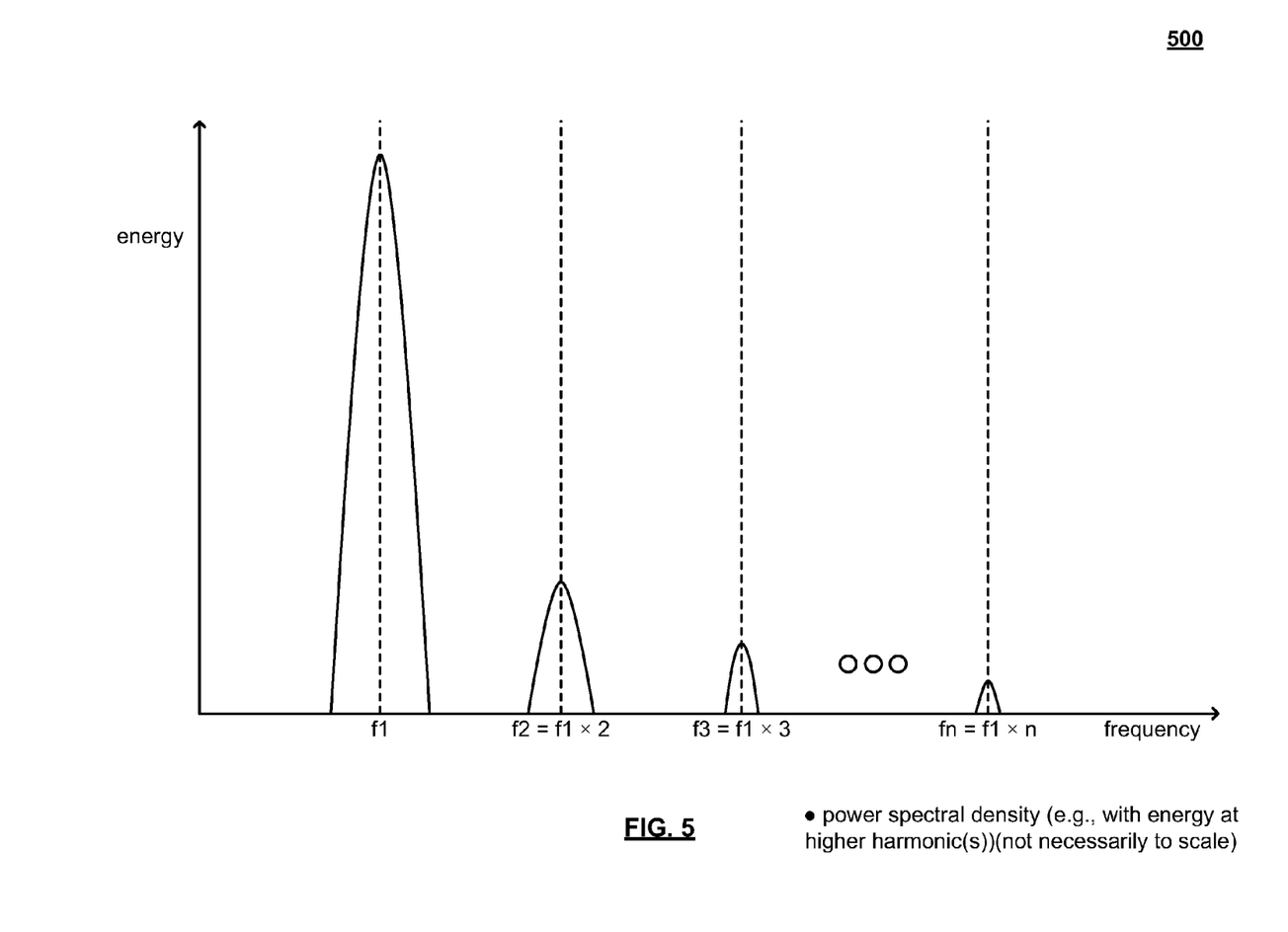
FIG. 5 illustrates an embodiment of a power spectral density (PSD) (not necessarily to scale) of a signal including energy within at least one harmonic of a fundamental frequency of a signal.

FIG. 5 illustrates an embodiment 500 of a power spectral density (PSD) (not necessarily to scale) of a signal including energy within at least one harmonic of a fundamental frequency of a signal. As may be seen with respect to this diagram, the majority of energy of the signal may correspond to a carrier frequency or a fundamental frequency by which the signal is provided. While it is noted that energy is employed as one possible characteristic in this embodiment 500, it is noted that any desired one or more other characteristics (e.g., energy, amplitude, phase, in-phase (I) and quadrature (Q) information, and/or other characteristic(s)) may alternatively be employed for determining, characterizing, analyzing, correlating, etc. various signals.

In the event of laser clipping, energy may be existent at certain harmonics of this fundamental or carrier frequency as shown in the diagram, it is noted that the particular shape and relative size of the energy shown with respect to the first frequency and the respective harmonics thereof are not necessarily provided to scale or with the exact shape, but the relative locations of these respective frequencies is provided for illustration to the reader.

Appropriate signal processing to identify the existence of such spectral content within a signal received by communication device, and particularly by determining correlation, if any, between energy corresponding to a fundamental frequency band of the communication signal and energy corresponding to one or more other harmonics (e.g., of the fundamental frequency) of the communication signal will allow for identification of whether or not clipping of one or more laser devices is occurring within the communication system with which the communication device interacts.

Figure 6:
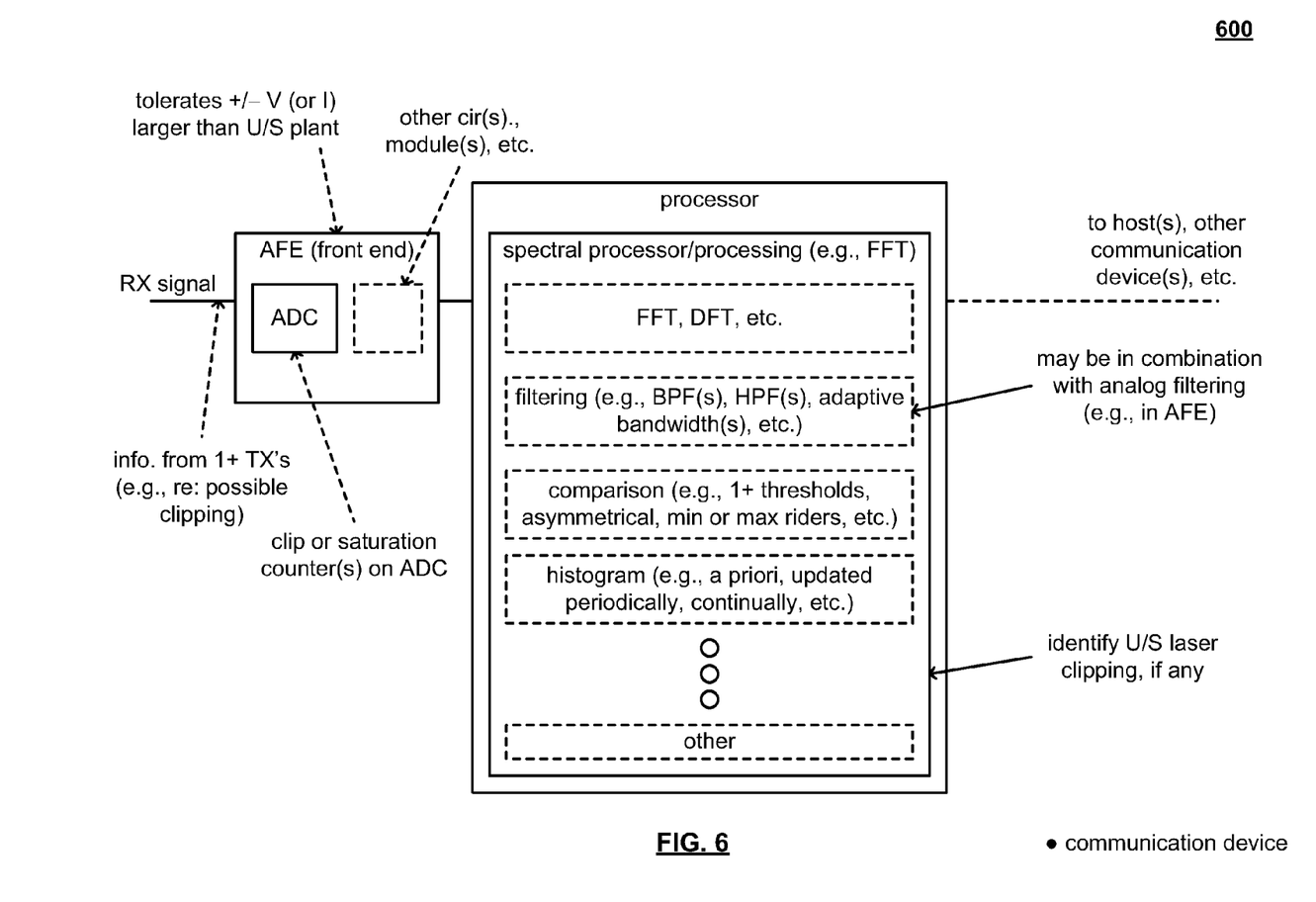
FIG. 6 illustrates an embodiment of a communication device.

FIG. 6 illustrates an embodiment 600 of a communication device. As shown within this diagram, communication device receives a signal, such as from a communication link within a communication system or network, and the signal undergoes appropriate processing by and analog front end (AFE). Such an AFE may be implemented to perform any of a number of operations including digital sampling, such as by an analog to digital converter (ADC), filtering (e.g., in the analog domain and/or the digital domain), frequency conversion (e.g., such as conversion from a carrier frequency down the baseband), scaling, gain adjustment, etc. Generally, such an AFE may be viewed as performing receipt and demodulation of a signal received from any communication link. Any of a number of perspective circuitries, modules, functional blocks, etc. may be implemented within various embodiments of an AFE.

It is also noted that such a communication device may receive information from one or more other communication devices (e.g., one or more transmitters) providing some indication regarding whether or not there is possible clipping within the communication system. For example, while certain embodiments operate such that a communication device may independently perform identification of clipping that may occur within one or more lasers implemented within the communication system, certain other embodiments may operate in such a way that cooperation is made between the communication device itself and one or more other communication devices within the system. For example, certain embodiments may operate such that multiple respective communication devices communicate and share information pertaining to laser clipping that may occur within the system. In other words, certain embodiments operate such that there is collaboration and coordination between and among various communication devices within the communication system.

After the AFE, one or more processors (one processor shown within this embodiment) operate to perform spectral processing of the received signal that has undergone front end and a processing by the AFE. For example, such a processor is implemented to perform spectral processing to identify whether or not laser clipping is occurring within the communication system with which the communication device interacts (e.g., in the upstream cable plant within a cable system embodiment). It is noted that any of a number of different types of communication systems may employ various aspects, and their equivalents, of the invention. For example, various communication systems may include different respective portions and components thereof implemented using different communication media, communication links, etc., and if even as few as one respective communication link therein operates using a light source (such as performing optical to electrical and/or electrical to optical conversion), then various aspects, and their equivalents, of the invention may be employed for identifying clipping therein.

Any of a number of different types of signal processing (spectral (digital) signal analysis) may be performed including fast Fourier transform (FFT) processing, discrete Fourier transform (DFT) processing, filter bank processing, etc. and/or any other form of signal processing including digital signal processing (e.g., such as may be performed using any spectral (digital) signal analysis such as by digital signal processor(s) (DSP(s)), FFT processor(s), DFT processor(s), one or more filters (such as using a filter bank), etc.). For example, in alternative embodiments, various types of filtering, such as bandpass filtering, high pass filtering, etc. may be implemented such that one or more filters may be appropriately tuned to one or more harmonics of the communication signal. In some instances, considering energy as a possible characteristic for determining, characterizing, analyzing, correlating, etc. various signals, a majority of the energy, besides the main or fundamental signal, is included within one of the respective harmonics of the fundamental frequency. In other instances, such energy may be distributed among more than one respective harmonic of the fundamental frequency.

In addition, such a processor may be implemented to perform filtering, and such filtering may be made in combination with analog filtering (e.g., such as may be performed within the AFE). Comparison of the energy as may be included within the fundamental frequency and/or any respective harmonics thereof may be made. For example, such comparison may be made with respect to one or more thresholds. In accordance with asymmetrical comparison, different respective thresholds may be performed with respect to considering signals in the positive and negative sense. Also, as described elsewhere herein, one or more histograms may be generated and used to assist in the identification of laser clipping.

Burst/impulse noise is defined as an elevation of the noise floor for a short time. This applies primarily to upstream cable transmissions, although the same principles may apply to downstream. For example, if the noise floor of the upstream cable plant is normally −40 dBc (noise in desired-signal band, in decibels relative to the carrier or desired signal), burst/impulse noise may result in the noise floor being raised to −10 dBc for a duration of 1 micro-sec, then returning to the −40 dBc quiescent level. The level, duration, and repetition rate of the burst/impulse noise are parameters that vary case by case.

Burst/impulse noise may have multiple causes. The two causes of interest in this discussion are (a) burst/impulse noise resulting from the ingress (external introduction) of noise into the cable plant, and (b) burst/impulse noise resulting from clipping of the upstream laser. Among other problems in the art, one deficiency therein is the distinction between these two types of burst/impulse noise. If it can be determined if it is ingress noise or laser clipping, operators can take action to fix these two distinctly different types of problems. For example, the cure for ingress-type burst/impulse noise is to tighten loose connectors, terminate unused cable stubs, check for cracked main or feeder cables or components such as amplifier housings, and check for intermittent ground connections at the drop cable. By contrast, one possible means to stem the effects of burst/impulse noise resulting from laser clipping, is to adjust the level into the upstream laser, and re-balance the upstream gain profile.

The method proposed to identify laser clipping is to look for harmonics. Laser clipping often results from an asymmetrical nonlinear transfer function in the laser. That is, positive excursions of the signal may clip at a different threshold than negative excursions of the signal. This will result in energy in even harmonics, in particular, the second harmonic of the signal. Odd harmonics may also be present, in particular, the $3^{rd}$ harmonic. In either case, the method proceeds as follows. The upstream spectrum is computed using, for example, some form of spectral (digital) signal analysis. Such spectral (digital) signal analysis may be performed using any desired means (e.g., FFT processing, DFT processing, filter bank processing, etc.). Such spectral (digital) signal analysis may be implemented and included within one or more headend burst receivers. The spectrum is analyzed to look for harmonics of the upstream signals. For example, consider an upstream signal being transmitted at 20 MHz carrier frequency. When laser clipping occurs, the $2^{nd}$ harmonic may be seen in the spectrum at 40 MHz, the $3^{rd}$ harmonic at 60 MHz, etc. The presence of energy at these harmonic frequencies indicates that laser clipping may be occurring.

It will be necessary to determine if the energy in the harmonic bands is coming from other signals happening to reside at 40 MHz and 60 MHz, or from harmonics of the signal at 20 MHz. The following time-correlation technique addresses this issue.

An important enhancement to the above technique is available if the spectral (digital) signal analysis (e.g., FFT processing, DFT processing, filter bank processing, etc.) can be synchronized to the upstream transmissions. This synchronous spectral (digital) signal analysis capability may also be implemented and included within one or more headend burst receivers. The synchronous spectrum technique operates as follows. Let us continue with the example of a desired signal at 20 MHz (the "fundamental" frequency), possibly producing a $2^{nd}$ harmonic at 40 MHz and a $3^{rd}$ harmonic at 60 MHz due to laser clipping. Our example will concentrate on the $2^{nd}$ harmonic. The spectral (digital) signal analysis is taken of the band at 40 MHz, with the spectral (digital) signal analysis captures synchronized to the TDMA burst transmissions occurring in the band at 20 MHz. Now when the desired signal bursts on for a short TDMA transmission, its $2^{nd}$ harmonic will appear at the same time. Hence, the spectral (digital) signal analysis taken in the 40 MHz band will see energy at the times when the desired signal is actively transmitting energy. Conversely, the spectral (digital) signal analysis taken in the 40 MHz band will see little or no energy (other than the background noise floor) at the times when the desired signal is not transmitting energy. Correlation between the envelope of the signal in the band at 20 MHz and the signal in the band at 40 MHz (or other harmonic bands) may be identified. The presence of a significant correlation (above a pre-determined threshold) indicates laser clipping.

This technique works best when there are no signals in the harmonic band, e.g., the band around 40 MHz in the example. This situation can be arranged by the following technique: Have the DOCSIS scheduler schedule quiet times in the 40 MHz band, to correspond to active transmissions in the 20 MHz band. Now when the signal at 20 MHz is transmitting, the band at 40 MHz should be silent. Any energy detected in the 40 MHz band during those times, above a given threshold, indicates laser clipping.

The technique will still work if quiet times cannot be scheduled in the 40 MHz band. Its performance will be reduced, however. Various types of time correlation between the 20 MHz and 40 MHz bands may be identified. If other signals are present in the 40 MHz band, the correlation will be noisier, but the correlation may nonetheless be detected by proper processing, including averaging over many samples.

To further generalize these techniques, any of a number of different forms of spectral (digital) signal analysis may be performed (e.g., an FFT is not strictly necessary). A bandpass filter (BPF) can be placed at a center frequency of 40 MHz and/or at other harmonic bands, and at least one characteristic corresponding thereto (e.g., energy) may be compared to a threshold during the times when the signal in the 20 MHz band is actively transmitting. Any energy detected in the 40 MHz band during those times, above a given threshold, indicates laser clipping.

If scheduler information is available, then the times at which the 20 MHz signal is transmitting, are known. If scheduler information is not available, the presence of energy in the 20 MHz band can be detected by placing a BPF at 20 MHz and detecting energy above a threshold.

Further, in certain embodiments, an asynchronous FFT can be used. The FFT takes spectra at random or periodically occurring times. The energy in the 20 MHz band and 40 MHz band is computed on each FFT spectrum. Correlation between the energy in the fundamental and harmonic bands may be identified.

To summarize, having scheduler information, scheduling quiet times, and/or a synchronous spectral (digital) signal analysis (e.g., FFT capability) are helpful, but not required. All that is necessary is to detect correlation between the signals in the fundamental band and one or more harmonic bands.

A further generalization may be as follows. In the above discussion, the envelope of the signal, that is, the power, was compared between the fundamental band and one or more harmonic bands. Here are variations on this technique:

a. The power (power envelope) vs time is computed in the fundamental band and in the harmonic band or bands. The correlation between these time series indicates laser clipping. This is the technique discussed above.

b. The signal in the fundamental band and harmonic bands can be captured as digital samples, for example, and converted to complex baseband, or complex envelope, representation (real and imaginary parts). The samples from the fundamental band (the desired signal x) are raised to the $2^{nd}$ power ($y=x^2$) to give an estimate of the $2^{nd}$ harmonic of the signal. The samples from the $2^{nd}$ harmonic band (call them z) are compared to y, using, for example, correlation. A correlation between y and z above a given threshold indicates probable laser clipping. Since the complex signal samples from the fundamental band are being employed, which includes their magnitude and phase information, this technique should be much more sensitive than the power-envelope technique, which uses only magnitude information.

Note that other nonlinearities, other than laser clipping, may produce harmonics. The relative strength of the harmonics can be used to provide a clue as to the source of the harmonics. For example, as discussed above, a strong $2^{nd}$ harmonic points to laser clipping, although this depends on the type of laser in use. A weak $2^{nd}$ harmonic, but strong odd harmonics, may indicate compression in an amplifier. Thus, the harmonic levels can be applied to a knowledge-based processor which will compute the most likely cause of the harmonics. The knowledge base can include the type of laser, including a model of the laser's nonlinear transfer function.

Note also that the harmonics due to laser clipping or other cause, may fall outside the upstream band. For example, the $3^{rd}$ harmonic of a 20 MHz signal falls at 60 MHz, which is above the typical upper band edge of 42 MHz for North American cable plants. However, depending on the arrangement of filtering at the headend, these harmonics may still be observed at the burst receiver. Current burst receivers can process input signals above 85 MHz. The processing described above for detecting laser clipping is therefore still applicable.

To explain most simply, there are two minimal complexity approaches for generating laser clip detection, and they can be used together.

One approach is to implement a "peak rider" signal for max and min "peaks" input to the burst receiver or line card containing burst receivers. This is similar to simple envelope detectors, which ride peaks with immediate attack and slow decay, but in this case the max and min signals are tracked separately, without the rectifier that is employed in conventional envelope detection. Any inputs which either hit a peak or create a new peak, or come within some defined striking distance of a peak, will trigger a clip detector circuit, or one part of a two-part clip detector algorithm. Saving the peak histories (both max peak and min peak) provides a useful record.

A second minimal complexity clip detector is to provide a high pass filter (passing higher frequency than the upstream upper band), followed by (more or less) conventional envelope detector, and a threshold detector operating on the envelope detector output.

Note that while these ideas (and others) are captured below and described as following a wideband capture such as an A/D, these ideas are implementable in minimal complexity analog designs as well.

The theory behind the HPF and envelope detector/threshold follows in line per the description provided below about harmonic detection, except that a) it does not require any synchronization with the upstream management and b) when trying to use spectral (digital) signal analysis (e.g., FFT captures) for filtering, the brief nature of clip events will in general cause a spectral (digital) signal analysis output (e.g., an FFT output) to be significantly attenuated and thus much harder to distinguish.

This processing is to be located after the upstream laser is optical to electrical converted, prior to the application of low pass filtering eliminating all but the upstream frequency band. Then, when a clipping event in the laser occurs it will generally coincide with a plurality of upstream channels bursting, and generally even a majority of upstream channels bursting, and thus there will probably be an upstream channel within the plurality of such channels which is at higher carrier frequency than $\frac{1}{3}^{rd}$ of the upstream upper bandedge. (Some margin will be needed for filter roll-off, so in practice this may require an upstream channel to be in the top half of the upstream frequency band.) Thus if a clipping event occurs, even if brief, it should generate a flash of harmonic and intermodulation energy which will excite the high pass filter for more than it is "normally" excited by noise and the strict out-of-band spurious emissions allowed in the upstream (and in the HFC plant there is a lot of low pass filtering of the upstream signal which limits the noise reaching the laser link which is above the upstream frequency band). The threshold trigger for the high pass filter envelope detector can be set adaptively by minimizing false alarms, and possibly by coordinating with the peak proximity triggers, or by control signal. By using 1) the peak riders and associated triggering when a voltage is in proximity to a max or min peak, and 2) the high pass filter followed by envelope threshold trigger, laser clip events are detected. If it is considered problematic to require a signal burst in the top half of the upstream frequency band in order to detect the laser clipping, a second filter, a bandpass filter, passing only the top half of the upstream frequency band, followed by two envelope detectors and two thresholds, may be employed. The higher of the two thresholds is associated with an envelope detector which has a much longer video bandwidth duration, so that it detects the presence of an actual upstream burst in the top half frequency band. This would indicate that a valid upstream signal was present and eliminate the other threshold for this band from triggering a laser clip event.

The respective points below describe the minimal complexity ideas as well as histogram capture approaches.

1. Clip or saturation counters may be implemented on analog to digital converters (ADCs) and within digital implementations. Such registers holding these counters may then be accessible. A good approach is to refresh the counters every second, but perhaps for a longer period, or even a settable period. Perhaps an alert should be generated if a counter exceeds a certain value, with different thresholds for alerts for different clip locations within the implementation.

2. An analog front end (AFE) may be implemented to tolerate a larger signal positive and negative swing than the upstream plant. (Or else such a device would be detecting clipping of that same respective device, instead of laser clipping.)

3. If the AFE of a cable modem (CM) cannot accommodate #2 above, and perhaps even if it can, it should be operative in implemented to perform wideband capture of the upstream which DOES have a larger positive and negative swing than the upstream plant. For the purposes of this capture (e.g., detection of laser clipping), the low noise floor that is needed for actually processing the upstream signal bursts will not necessarily be needed. The signal processing that is needed "behind" this wideband capture to facilitate detection of upstream clipping is relatively simple. Several algorithms will be discussed, some more demanding of resources than others.

4. One technique is to build a histogram of the captured wideband input voltage should be created. With a 12 bit A/D this corresponds to counting the number of times that each of the 4096 codes get "hit". Post-processing and/or distribution of this information may require memory or data rates which are significant. The clipping level may vary over time (e.g., 24 hour temperature variations, for one source). But if there is a desire to address this system issue, this capture may be deemed worthwhile. With 2.5 Giga-samples/sec and 12 bit A/D, in one second this works out to 6 million (~2^23) counts per A/D code, but of course the mid-codes will be hit much more often than the extremes. A means for collecting this information and storing it for subsequent post-processing may be valuable. Eventually the upstream positive and negative clip points will "reveal themselves" in such a histogram—sooner rather than later if clipping is in fact present to any degree. Due to some burst receiver noise (and CMTS amp noise) and perhaps interference ingressing within the burst receiver or CMTS prior to the A/D, It is not expected that an upper and lower bounding histogram bin will be strictly indicated (and variation over time WILL occur, but slowly compared to one second, for example, so this drift has to be considered in any solution, but is not a driving factor for a short examination time). However, it is very possible that a non-monotonicity in the histogram will be revealed about the upstream positive and negative clipping voltages as presented to the A/D. Determining the durations for compiling the histograms (before refreshing, for example) may take practice (field experience) and thus flexibility in this regard is warranted in a field unit. Combining histogram results in a post-processor will address refreshing too quickly. Zooming in on a subset of histogram bins, under control or perhaps cycling over time, can reduce the memory and data rate burden. The refresh time for exposing the positive and negative clip points of the upstream channel will vary depending on the upstream traffic, too; if few channels are used simultaneously then the extreme upstream voltages will be experienced much less often. In addition to the histogramming, there are some relatively simple methods, too, for detection of clipping events in the upstream path, which are discussed next.

5. Separately for both max and min (e.g., most positive and most negative) inputs to a CMTS burst receiver (or line card containing burst receivers), implement an "envelope detector" or max hold circuit with leakage. Such a detector could be more sophisticated than a simple "peak rider" with leakage rate, such as "riding" the average of the 8 largest positive values over the past minute (or fill in the blank for time) for one example. (And similar for the most negative or most extreme minimum values.) Storing the time history of the max and min "riders" will provide one indication upstream loading and potentially clipping. Flexibility ranges may be determined as desired for various applications. If the upstream undergoes significant oversampling, then for counting 8 (for example) events over the last minute (for example) would probably NOT count a cluster of samples (5 positive extremes in a span of 20 samples, for example) as separate events. If a simple peak rider is implemented, this is not an issue. The peak rider has to have some sort of leakage, either a continual drain or a time-out, or combination. With a time-out approach, it is required to retain a list of more recent extremes, but falling short of the aging most extreme sample. Perhaps extremes over 15 second windows are maintained, to be called upon when a true extreme "times out".

6. As a second element in the simple clip detector, in conjunction with the max and min "riders", any time a voltage is within close proximity of either the current max or min, then this would initiate a "potential clip event" trigger. The width of the proximity band could be adapted or flexible. This trigger could be the clip detector all by itself, or it could be one part of a very simple multipart clip detection scheme. In general, this trigger would facilitate the storage of the most recent, and some subsequent, wideband samples.

7. A third element is a high pass filter on the output of the upstream laser optical to electrical output (e.g., captured by the wideband A/D). When a clipping event in the laser occurs it will generally coincide with a plurality of upstream channels bursting, and generally even a majority of upstream channels bursting, and thus there will probably be an upstream channel within the plurality of such channels which is at higher carrier frequency than $\frac{1}{3}^{rd}$ of the upstream upper bandedge. A clipping event should generate a brief flash of harmonic and intermodulation energy which will excite the high pass filter to a larger amount than it is "normally" excited by noise. The threshold trigger for the high pass filter envelope detector can be set adaptively by minimizing false alarms, and possibly by coordinating with the peak proximity triggers, or by control signal.

8. By using a) the peak riders and associated triggering when a voltage is in proximity to a max or min peak, and b) the high pass filter followed by envelope threshold trigger, laser clip events are detected.

9. If it is considered problematic to require a signal burst in the top half of the upstream frequency band in order to detect the laser clipping, a second filter, a bandpass filter, passing only the top half of the upstream frequency band, followed by two envelope detectors and two thresholds, may be employed. The higher of the two thresholds is associated with an envelope detector which has a much longer video bandwidth duration, so that it detects the presence of an actual upstream burst in the top half frequency band. This would indicate that a valid upstream signal was present and eliminate the other threshold for this band from triggering a laser clip event.

Figure 7:
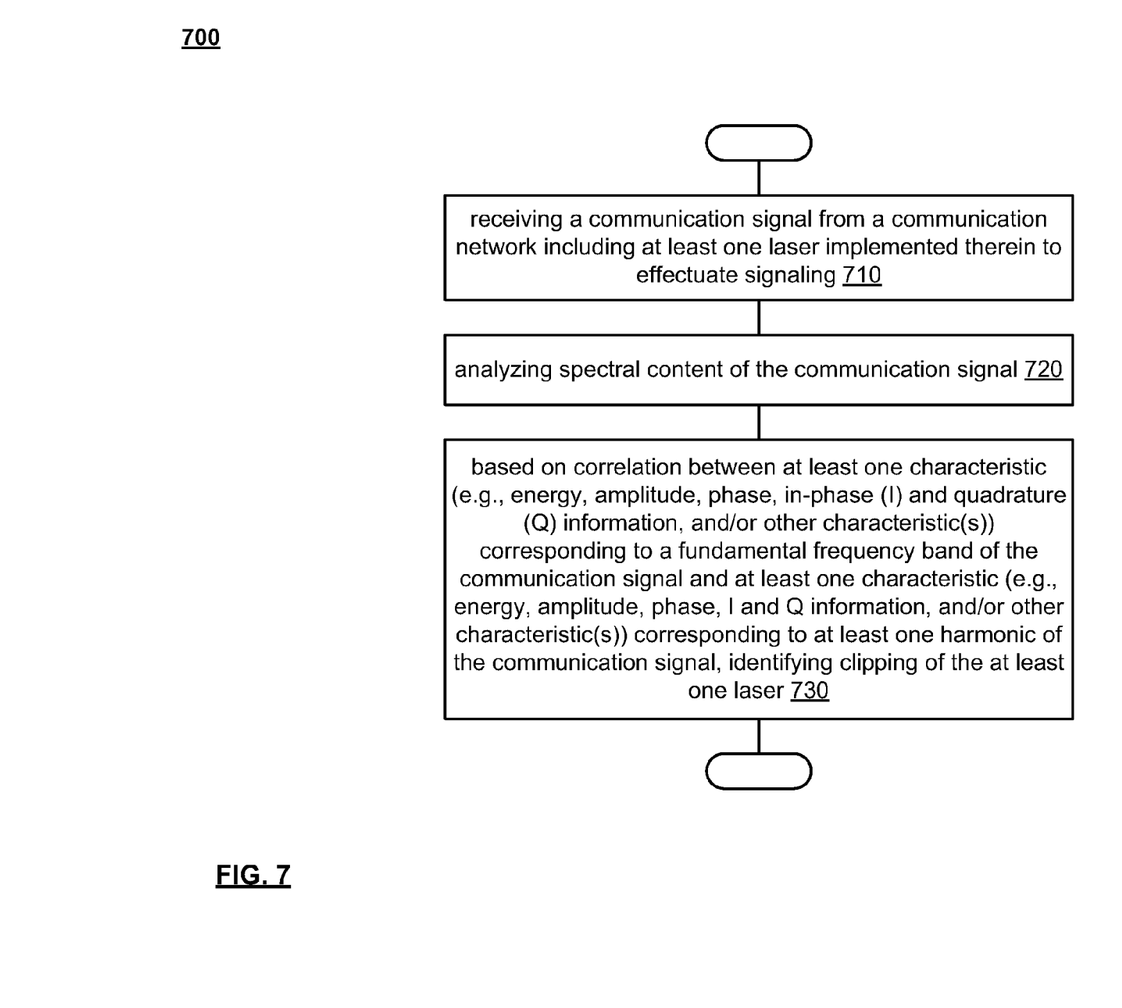
FIG. 7 illustrates an embodiment of a method for operating at least one communication device.

FIG. 7 illustrates an embodiment of a method 700 for operating at least one communication device. Referring to method 700 of FIG. 7, the method 700 begins by receiving a communication signal from a communication network including at least one laser implemented therein to effectuate signaling, as shown in a block 710. Within an embodiment of the method 700 implemented within a community edition device, such communication signal be received via an input of the communication device.

The method 700 continues by analyzing spectral content of the communication signal, as shown in a block 720. The method 700 then operates by identifying clipping of the at least one laser within the communication system, as shown in a block 730. This identification may be made based upon correlation between at least one characteristic (e.g., energy, amplitude, phase, and/or other characteristic(s)) corresponding to a fundamental frequency band of the committee the signal and at least one characteristic (e.g., energy, amplitude, phase, and/or other characteristic(s)) corresponding to at least one harmonic of the communication signal.

Figure 8:
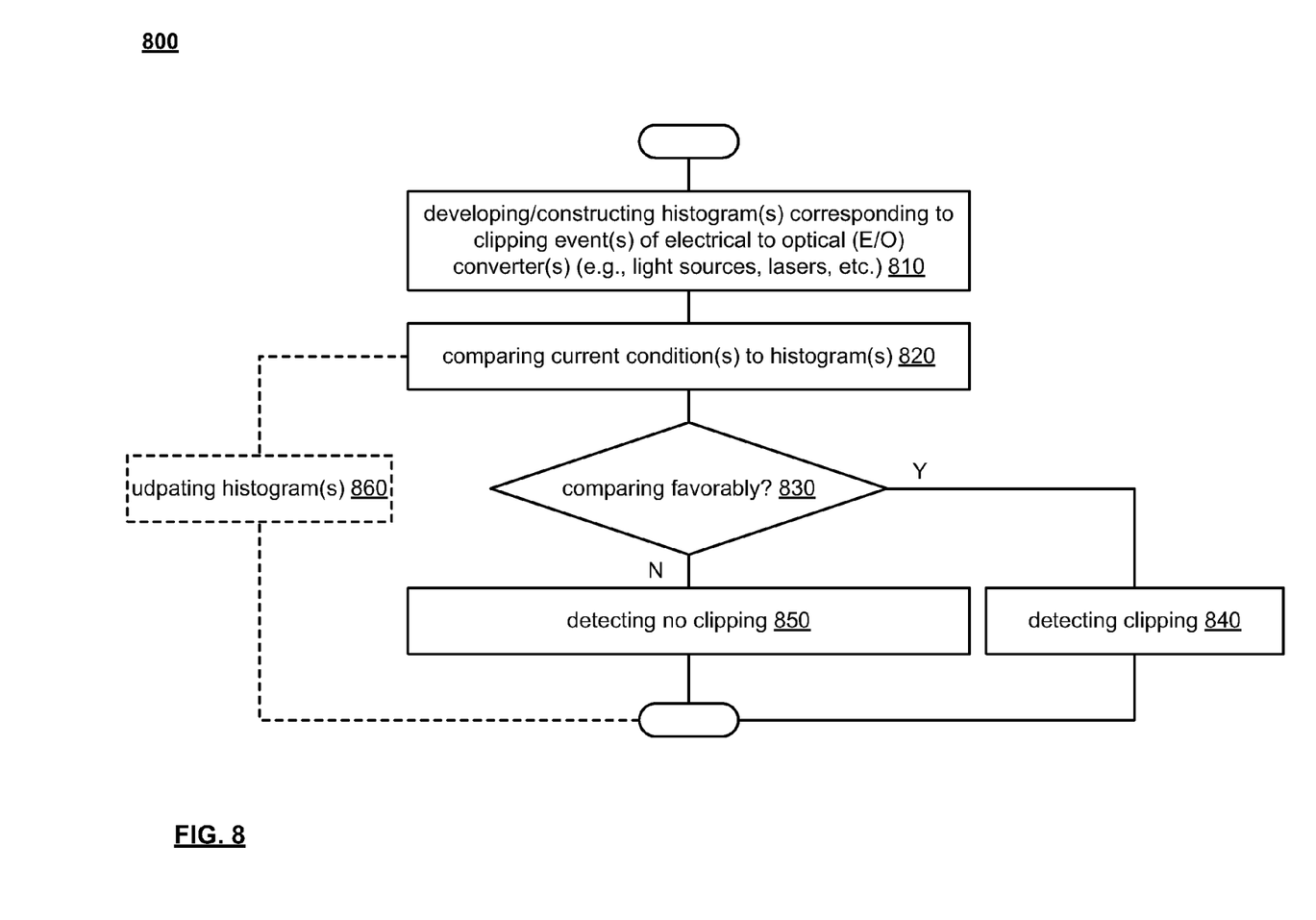
FIG. 8 illustrates an alternative embodiment of a method for operating at least one communication device.

FIG. 8 illustrates an alternative embodiment of a method 800 for operating at least one communication device. Referring to method 800 of FIG. 8, the method 800 begins by developing and/or constructing one or more histograms corresponding to one or more clipping events of electrical to optical converters, as shown in a block 810. Again, while lasers are employed within a number of the various diagrams and/or embodiments herein, it is noted that any such electrical to optical converter device (e.g., light emitting diodes, laser diodes, light sources, etc.) may employ various aspects, and their equivalents, of the invention.

The method 800 continues by comparing one or more current conditions to the one or more histograms, as shown in a block 820. Such current conditions may correspond to any of a number of considerations including local operating characteristics of a communication device, remote operating conditions associated with one or more remotely implemented to mediation devices, characteristics associated with signals received and are transmitted by the communication device, etc.

If one or more of the current operating conditions compares favorably with one or more of the histograms, as shown in a decision block 830, then the method 800 operates by detecting clipping, as shown in a block 840. That is to say, if the comparison is favorable (e.g., within at least one desired constraint, limit, margin, etc.) as determined in the decision block 830, then the method 800 operates by detecting clipping, as shown in a block 840.

Alternatively, if the comparison is not favorable (e.g., within at least one desired constraint, limit, margin, etc.) as determined in the decision block 830, then the method 800 operates by detecting no clipping, as shown in a block 850.

In certain embodiments, the method 800 may operate by updating one or more of the histograms, as shown in a block 860, and then the method 800 may also continue back to the operations associated with the block 820.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 (or alternatively, when the magnitude of signal 2 is less than that of signal 1).

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, electrical, optical, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
an input configured to receive a communication signal from a communication network that includes at least one laser implemented therein to effectuate signaling; and
a processor configured to:
analyze spectral content of the communication signal;
generate, based on historical correlation between at least one characteristic corresponding to a fundamental frequency band of the communication signal and at least one characteristic corresponding to at least one harmonic of the communication signal when the at least one characteristic corresponding to the fundamental frequency band of the communication signal is detected, a histogram corresponding to a plurality of clipping events of the at least one laser;
identify clipping of the at least one laser based on the histogram and based on current correlation between the at least one characteristic corresponding to the fundamental frequency band of the communication signal and the at least one characteristic corresponding to the at least one harmonic of the communication signal and also based on spectral content analysis of the communication signal; and
analyze the at least one characteristic corresponding to the at least one harmonic of the communication signal when detecting the at least one characteristic corresponding to the fundamental frequency band of the communication signal to determine at least one of the historical correlation or the current correlation.

2. The apparatus of claim 1, wherein the processor is further configured to:
perform fast Fourier transform (FFT) processing of the communication signal to analyze the spectral content within the communication signal.

3. The apparatus of claim 1 further comprising:
at least one band pass filter (BPF), tuned to the at least one harmonic of the communication signal, configured to identify at least one of amplitude or phase corresponding to at least one harmonic of the communication signal for use by the processor to analyze the spectral content within the communication signal.

4. The apparatus of claim 1, wherein the at least one characteristic corresponding to the at least one harmonic of the communication signal corresponding to a first harmonic of the communication signal and corresponding to a second harmonic of the communication signal.

5. The apparatus of claim 1 further comprising:
a communication device that is operative within at least one of a satellite communication system, a wireless communication system, a wired communication system, a fiber-optic communication system, a mobile communication system, or a cable system.

6. An apparatus comprising:
an input configured to receive a communication signal from a communication network that includes at least one laser implemented therein to effectuate signaling; and
a processor configured to:
analyze spectral content of the communication signal; and
identify clipping of the at least one laser based on correlation between at least one characteristic corresponding to a fundamental frequency band of the communication signal and at least one characteristic corresponding to at least one harmonic of the communication signal and also based on spectral content analysis of the communication signal.

7. The apparatus of claim 6, wherein the processor is further configured to:
perform fast Fourier transform (FFT) processing of the communication signal to analyze the spectral content within the communication signal.

8. The apparatus of claim 6 further comprising:
at least one band pass filter (BPF), tuned to the at least one harmonic of the communication signal, configured to identify at least one of amplitude or phase corresponding to at least one harmonic of the communication signal for use by the processor to analyze the spectral content within the communication signal.

9. The apparatus of claim 6, wherein the at least one characteristic corresponding to the at least one harmonic of the communication signal corresponding to a first harmonic of the communication signal and corresponding to a second harmonic of the communication signal.

10. The apparatus of claim 6, wherein the processor is further configured to:
analyze the at least one characteristic corresponding to the at least one harmonic of the communication signal when detecting the at least one characteristic corresponding to the fundamental frequency band of the communication signal to determine the correlation.

11. The apparatus of claim 6, wherein the processor is further configured to:
compare energy corresponding to the at least one harmonic of the communication signal with at least one threshold when the processor detecting energy corresponding to the fundamental frequency band of the communication signal to determine the correlation.

12. The apparatus of claim 6, wherein the processor is further configured to:
generate a histogram corresponding to a plurality of clipping events of the at least one laser; and
identify the clipping of the at least one laser based on the histogram and based on the correlation between the at least one characteristic corresponding to the fundamental frequency band of the communication signal and the at least one characteristic corresponding to the at least one harmonic of the communication signal.

13. The apparatus of claim 6 further comprising:
a communication device that is operative within at least one of a satellite communication system, a wireless communication system, a wired communication system, a fiber-optic communication system, a mobile communication system, or a cable system.

14. A method for execution by a communication device, the method comprising: via an input of the communication device, receiving a communication signal from a communication network that includes at least one laser implemented therein to effectuate signaling;
analyzing spectral content of the communication signal; and
based on correlation between at least one characteristic corresponding to a fundamental frequency band of the communication signal and at least one characteristic corresponding to at least one harmonic of the communication signal and also based on spectral content analysis of the communication signal, identifying clipping of the at least one laser.

15. The method of claim 14 further comprising:
performing fast Fourier transform (FFT) processing of the communication signal to analyze the spectral content within the communication signal.

16. The method of claim 14 further comprising:
employing at least one band pass filter (BPF), tuned to the at least one harmonic of the communication signal, to identify at least one of amplitude or phase corresponding to at least one harmonic of the communication signal to analyze the spectral content within the communication signal.

17. The method of claim 14, wherein the at least one characteristic corresponding to the at least one harmonic of the communication signal corresponding to a first harmonic of the communication signal and corresponding to a second harmonic of the communication signal.

18. The method of claim 14 further comprising:
comparing energy corresponding to the at least one harmonic of the communication signal with at least one threshold, when energy corresponding to the fundamental frequency band of the communication signal detected, to determine the correlation.

19. The method of claim 14 further comprising:
generating a histogram corresponding to a plurality of clipping events of the at least one laser; and
based on the histogram and based on the correlation between the at least one characteristic corresponding to the fundamental frequency band of the communication signal and the at least one characteristic corresponding to the at least one harmonic of the communication signal, identifying the clipping of the at least one laser.

20. The method of claim 14, wherein the communication device is operative within at least one of a satellite communication system, a wireless communication system, a wired communication system, a fiber-optic communication system, a mobile communication system, or a cable system.

* * * * *